United States Patent [19]

Ng et al.

[11] 4,101,986
[45] Jul. 25, 1978

[54] REGULATABLE FLUSH VALVE FOR TANK FLUSH TOILETS

[76] Inventors: Walter C. Ng, 2716 Pickfair La., Livermore, Calif. 94550; Conrad A. Wilgus, 5506 Greenridge Rd., Castro Valley, Calif. 94546

[21] Appl. No.: 820,164

[22] Filed: Jul. 29, 1977

[51] Int. Cl.² ............................................ E03D 1/34
[52] U.S. Cl. ..................................... 4/325; 222/282; 4/389; 4/402
[58] Field of Search ............ 4/61, 60, 52, 58, DIG. 3; 222/282

[56] References Cited

U.S. PATENT DOCUMENTS

| 2,068,406 | 1/1937 | Freed | 4/52 |
|---|---|---|---|
| 3,384,906 | 5/1968 | Hamilton | 4/60 |
| 3,906,554 | 9/1975 | Johnson | 4/52 |
| 3,958,723 | 5/1976 | Stähle | 222/282 |

FOREIGN PATENT DOCUMENTS

| 101,229 | 3/1965 | Denmark | 4/60 |

Primary Examiner—Richard E. Aegerter
Assistant Examiner—L. Footland
Attorney, Agent, or Firm—David E. Newhouse

[57] ABSTRACT

A regulatable flush valve for tank type flush toilets includes a piston-cylinder dash pot, a weighted (fluid filled) plug/valve, a cylindrical overflow tube and a fluid vortex generating element secured in a coaxial arrangement vertically above the outlet of the toilet tank. The piston and plug/valve secured to the overflow tube are lifted from a normally closed position by a conventional pivoting handle mechanism. The piston-cylinder dash pot determines the water volume of a particular flush by controlling the rate of descent of the weighted plug/valve. The vortex generating element works in combination with the walls of the raised plug/valve to generate an energetic fluid vortex as the water flows from the tank into the toilet bowl. The vortex generated by the generating element is complementary to vortex generating elements within the toilet basin to increase washing action in the toilet bowl. The above combination of elements significantly reduces the volume of water required for complete flushing action.

11 Claims, 3 Drawing Figures

REGULATABLE FLUSH VALVE FOR TANK FLUSH TOILETS

BACKGROUND OF THE INVENTION

The present invention relates to a combination of elements for decreasing water use by conventional tank type flush toilets.

Tank type flush toilets typically use between eight and twenty liters of water for flushing waste material from and replenishing the water in a toilet bowl. Water economy demands that the volume of water utilized in flushing a toilet be reduced.

Various devices have been utilized to reduce the volume of water used by tank type flush toilets. For example, it has been determined that not all of the water contained in the toilet tank is required for complete flushing action in the toilet bowl. Accordingly, people place bricks, bottles and other objects within the toilet tanks to reduce the volume of water held in the tank.

Another approach described in U.S. Pat. No. 3,906,554 relates to a two level flush valve mechanism which allows only a portion of the water to drain from the tank for a low water volume flush and all of the water to drain from the tank for a high volume flush. Two level flush valve mechanisms have several intrinsic disadvantages in that two valve-plug arrangements are required and in that the valve/plug arrangements require rather complex sealing arrangements to render them water tight. Other disadvantages of the two level tank valve device relate to the fact that in a low volume flush, water exhausts from the upper portion of the tank and therefore does not usually have sufficient pressure for energetic flushing action in the toilet bowl.

Other approaches for reducing water usage in toilets relate to increasing the energy of the flushing action within the toilet bowl. For example, water distribution systems in the bowl are often designed to induce energetic fluid vortexes within the bowl for efficient washing and evacuation of waste materials and fluids from the bowl into the sewer drain.

SUMMARY OF THE INVENTION

A regulatable flush valve mechanism for tank type toilets is described which includes a cylindrical overflow tube, a piston-cylinder dash pot arrangement, a weighted (fluid filled) plug/valve, and a fluid vortex generating element secured in a coaxial arrangement above the outlet of a conventional toilet tank. The overflow tube, piston and weighted plug move as an integral unit. The cylinder and fluid vortex generating elements are coaxially disposed around the tube, piston and plug member. The fluid vortex generating element works in combination with the exterior walls of the weighted plug/valve for inducing an energetic fluid vortex in the water as it drains from the tank under the influence of gravity for enhancing the energetic action of the fluid in washing and evacuating waste materials from the toilet bowl. The piston-cylinder dash pot determines the volume of water utilized in a particular flush by controlling the rate of descent of the weighted plug/valve from the time it is lifted until it again seats in the valve seat.

A particularly novel feature of the described flush valve relates to an adjustable bleeder orifice on the piston for regulating the rate of descent of the weighted plug/valve enabling the device to be used in different toilet systems which require different volumes of water for flushing.

A particular advantage of the described regulatable vortex flush valve is that it allows continuous users of a particular toilet system to gauge the minimum volume of water necessary to evacuate a particular type of waste material from the toilet bowl.

Another advantage of the described regulatable vortex flush valve is that the fluid vortex generating element is designed to generate a fluid vortex which complements the vortex generating capacity of the bowl water distribution system.

Other novel aspects of the described regulatable vortex flush valve relates to the unitary coaxial construction of the overflow tube, piston and weighted plug/valve.

Finally, other objects, advantages and novel features of the invented regulatable vortex flush valve will become apparent upon examination of the following detailed description of preferred embodiments of the valve together with the accompanying figures.

DESCRIPTION OF A PREFERRED EMBODIMENT

Figures 1, 2:
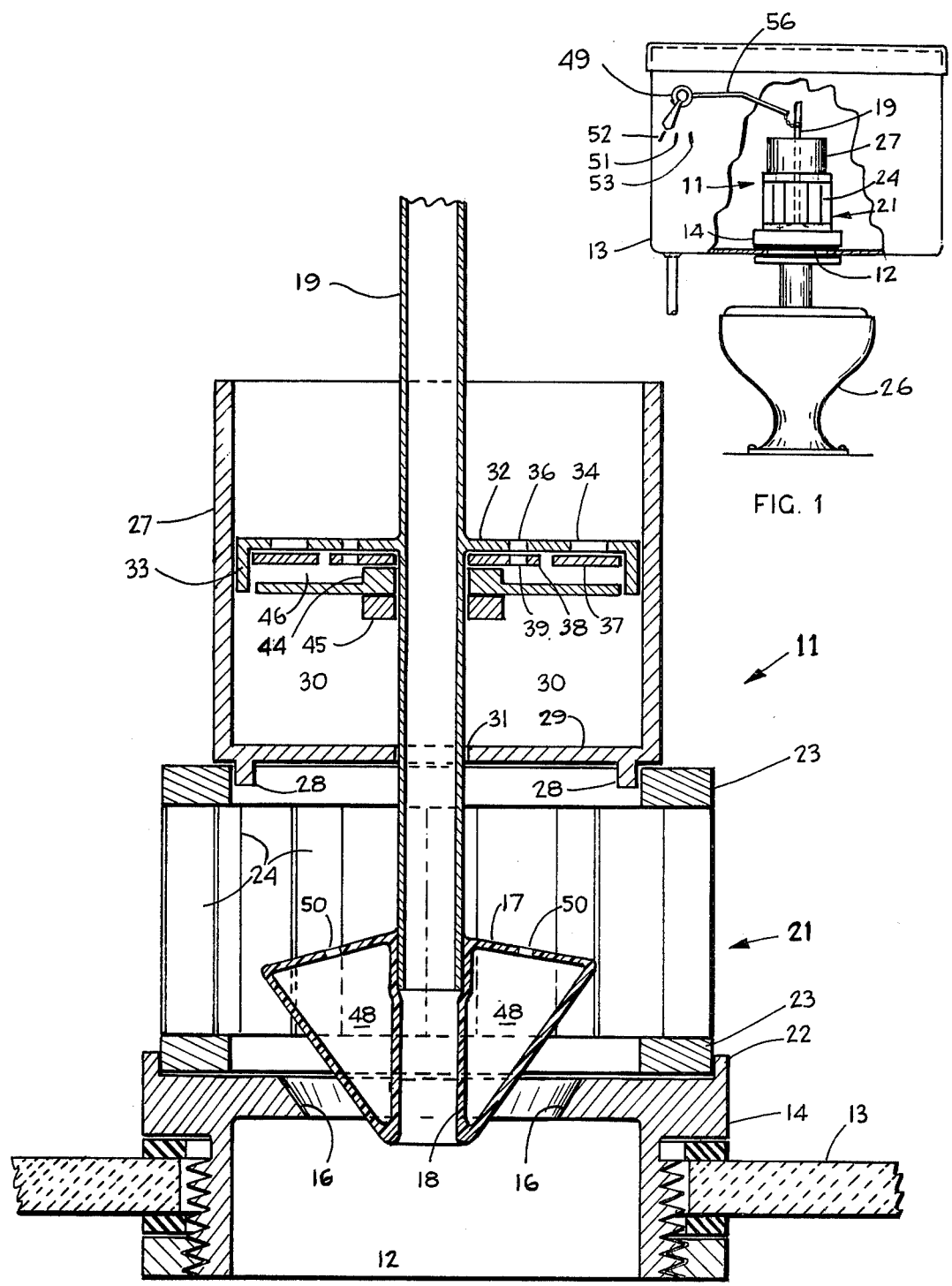
FIG. 1 is a cutaway side elevation view of a tank type toilet showing the invented regulatable flush valve in place over the outlet of the toilet tank.
FIG. 2 is a side elevation view of the invented regulatable flush valve.
Figure 3:
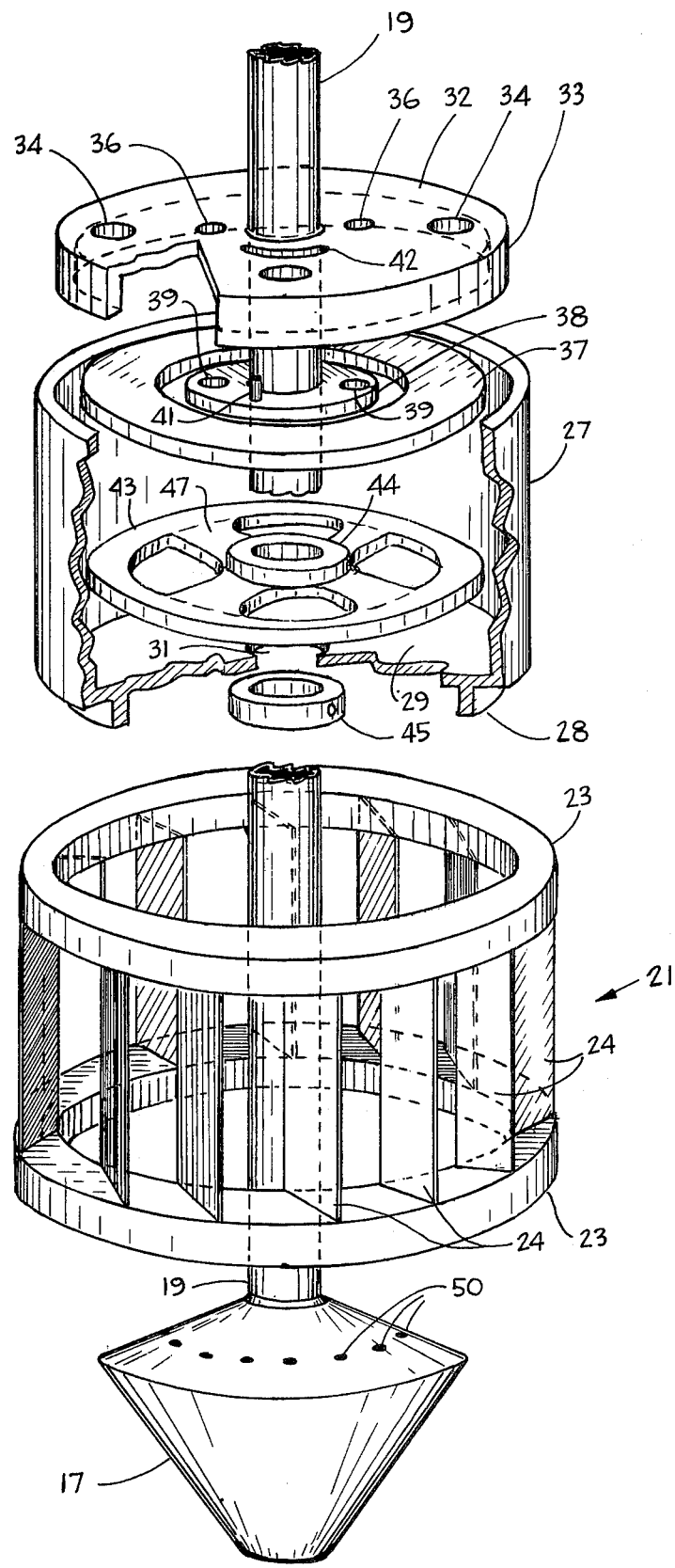
FIG. 3 is an exploded perspective view of the elements of the regulatable flush valve.

Referring to FIGS. 1, 2 and 3, the invented regulatable flush valve 11 includes in a coaxial arrangement above the drain outlet 12 of the toilet tank 13 an adapter element 14 having an annular valve seat 16, a hollow frusto-conical valve/plug element 17 having a central passageway 18, an overflow tube or rod 19 received coaxially and secured within the valve/plug passageway 18 extending therefrom towards the top of the toilet tank 13, and an annular liquid vortex generator 21 coaxially mounted on the adapter element. The fluid vortex generator 21 is held in place above the adapter element 14 by an annular shoulder 22 integral with the adapter element which has a slightly greater inner diameter than the outer diameter of the annular vortex generator 21.

In more detail, referring to FIG. 3, the annular liquid vortex generator is an integral cylindrical unit formed by two spaced apart parallel annular rings 23 and a plurality of planer vanes 24 extending between the parallel annular rings 23. The vanes 24 are angled so as to direct water flow tangentially into the inside volume of the vortex generator 21. The liquid vortex generator 21 can either generate a vortex flowing in a clockwise direction or a counterclockwise direction relative to the tank outlet 12 by turning the vortex generator 21 over. In particular, in the embodiment shown in FIG. 3, the vortex generator 21 will generate a clockwise fluid vortex relative to the tank outlet 12. However, by turning the fluid vortex generating element 21 over the vanes 24 will be oriented to generate a counterclockwise liquid vortex relative to the drain outlet 12. The liquid vortex, whether clockwise or counterclockwise, generated by the vortex generating element 21 should be complementary or add to liquid vortexes generated by the liquid distribution system within the toilet bowl or cistern 26.

The liquid vortex generating capabilities of the vortex generator 21 are enhanced by the conical walls of the valve/plug element 17. In particular, when the valve/plug element 17 is lifted within the cylindrical volume of the votex generating element 21 during a flush, an annular region is defined. The vanes 24 directing liquid flow into the annular region causes the liquid to swirl energetically as it drains from the tank 13. In more detail the combination of the outer frusto-conical side walls of the valve/plug element 17 and the vanes 24 of the fluid vortex generator 21 induce a substantial tangential or transverse velocity component into liquid draining from the toilet tank 13. This transverse velocity component being additive to the vortex generating elements of the liquid distribution system of the toilet bowl 26 greatly increases the turbulence and thus washing action of the liquid within the toilet bowl 26.

Coaxially mounted on top of the liquid vortex generator 21 is a cylindrical cup element 27 which is held in place by an integral annular shoulder 28 having an outside diameter slightly less than the inside diameter of the upper annular ring 23 of the vortex generator 21. The bottom 29 of the cylindrical cup element 27 has a cylindrical hole 31 having a slightly larger diameter than the outer diameter of the overflow tube 19. The overflow tube 19 extends through the hole 31.

A cylindrical piston element 32 is secured to the overflow tube 19 for movement within the cylindrical cup volume. The cylindrical piston element 32 includes an integral annular shoulder 33 extending downwardly around the peripherial edge of the piston element 32 proximate the inner cylindrical walls of the cup element 27. The piston element 32 has a plurality of inlet ports 34 and bleeder orifices 36 through its top surface which allow liquid to flow into and out of the interior volume 30 of the cylindrical cup 27 below the piston element 32.

A flat check valve ring 37 is coaxially received within the outer annular shoulder 33 of the piston element 32 in registry with the inlet ports 34. An adjustment ring 38 is coaxially positioned within the check valve ring 37. The adjustment ring 38 is a flat ring element having a central hole with a diameter slightly greater than the outer diameter of overflow tube 19 and a plurality of orifices 39 penetrating through its flat surface. The orifices 39 are oriented such that they may be rotated into and out of registry with the bleeder orifices 36 of the piston element 32. The adjustment ring 38 also includes pin element 41 which extends upwardly from the adjustment ring 38 through a slot 42 cut through the piston element 32. Accordingly, the orifices 39 through the adjustment ring 38 may be rotated into and out of registry with the bleeder orifices 36 by physically moving the pin element 41 in the slot 42 through the piston element 32.

A retainer ring 43 having a diameter at least equivalent to that of the check valve ring 37 is coaxially positioned around the overflow tube 19 below the adjustment ring 38. The retainer ring 43 includes an integral annular inner shoulder 44 proximate the overflow tube 19 for holding the adjustment ring 38 proximate the piston element 32 yet allowing the check valve ring 37 to move freely in the annular space 46 between the outer rim of the retainer ring 43 and the top wall of the piston element 32. A plurality of spokes 44 connects the inner annular shoulder 44 to the outer rim of the retaining ring 43 to allow liquid to flow through the inlet ports 34 into the interior volume 30 of the cylindrical cup 27 when the piston element 32 is raised in the cylindrical cup 27 and to allow water to flow from the interior volume 30 of the cylindrical cup 27 out the bleeder orifices 36 as the piston element 32 descends in the annular cup 27. The check valve ring 37 functions to prevent or greatly restrict fluid flow out of the inlet ports 34 as the piston element 32 descends in the annular cup 27.

The check valve ring 37, adjustment ring 38 and retainer ring 43 are secured in axial position around the overflow tube 19 within the annular space defined between peripheral annular shoulder 33 of the piston element 32 and the overflow tube 19 by a collar element 45. The collar element 45 is composed of a resilient material such as rubber, silicone rubber, neoprene or similar such material. The collar 45 has an outer diameter greater than the inner diameter of the retainer ring 43 and an inner diameter slightly less than the outer diameter of the overflow tube 19. Thus, the collar 45 snugly fits around the overflow tube 19 and prevents the retainer ring 43 and, hence, adjustment ring 38 and check valve ring 37 from moving axially down the overflow tube 19.

Referring back to FIG. 1, as previously stated, the overflow tube 19 extends towards the top of the toilet tank 13 and functions to prevent liquid from overflowing out of the tank 13. Specifically, liquid is conventionally introduced into the tank 13 through a conventional float valve device used in present tank type flush toilets. In the event the float valve mechanism does not operate properly, the liquid does not overflow from the toilet tank 13 but rather drains out through the overflow tube 19 out the tank outlet 12 into the toilet bowl 26.

The frusto-conical valve/plug element 17 is not a conventional floating ball type valve/plug element but rather is weighted with the liquid filling the toilet tank 13. In particular, the valve/plug element 17 has a plurality of ports 50 on its upper surface which communicate into the hollow volume 48 between the frusto-conical outer walls and the walls of the central passageway 18 through the valve/plug 17. Accordingly, the valve/plug element 17 does not float when lifted from the valve seat 16 but rather descends towards the valve seat 16 under the influence of a force gradient due to gravity and the pressure differential between moving and stationary liquid.

The valve/plug element 17 should be composed of a flexible resilient material such as rubber, silicone, neoprene and other resilient materials which are impervious to the particular liquid utilized by the toilet. The remaiming elements, i.e. the adapter element 14, the vortex generator 21, the cylindrical cup 27, the piston element 32, the check valve ring 37, the adjustment ring 38 and the retainer ring 42, may be composed of rigid plastic materials which are also impervious to the liquid used by the toilets. The overflow tube 19 may be composed either of metal or an impervious plastic material depending upon the relative densities of the valve/plug element 17 and the liquid flushing medium. In particular, the valve/plug element 17, overflow tube 19 and piston element 32 should have sufficient density when imersed in water or other liquid flushing medium to descend towards the valve seat 16 when raised therefrom and released.

The valve/plug element 17 is raised from the valve seat 16 together with the piston element 32 secured to the overflow tube 19 by a conventional pivoting toilet handle lever mechanism 49. The lever 56 of the pivoting handle mechanism 49 is secured to the upper end of the overflow tube 19 by a flexible connecting means such as a chain or other such flexible linkage. Accordingly, by pivoting the handle mechanism 49, the overflow tube 19, the piston 32 and the valve/plug 17 are lifted as a unit.

DESCRIPTION OF OPERATION

As the piston element 32 is raised in the cylindrical cup 31, water flows into the interior cup volume 30 via the inlet ports 34 through the piston element 32. Upon release of the pivoting handle mechanism 49 the overflow tube 19, the piston element 32 and valve/plug element 17 are free to descend, the rate of descent being controlled by the flow of liquid from the interior cup volume 30 through the bleeder and adjustment orifices 36 and 39 respectively. Accordingly, the time interval measured from the instant the valve/plug 17 is raised from the valve seat 16 until it reseats determines the volume of water which will flow from the toilet tank 13 into the toilet bowl 26 for flushing waste material therefrom.

The time period required for the valve/plug element 17 to reseat on the valve seat thus depends on the height which the piston element 32 is raised in the cylindrical cup 27. The height which the piston element 32 is raised in the cylindrical cup 27 depends upon the degree of rotation of the pivoting handle lever mechanism 29. Accordingly, the user of the toilet can regulate the volume of water required to flush waste materials from the toilet bowl 26. For example, for liquid waste materials it may only be desirable to change the water in the toilet bowl 26 in which case the user only pivots the handle lever mechanism 49 slightly beyond the normally closed position 52. Alternatively, if a greater volume of liquid is required to flush, for example, solid waste material from the toilet bowl 26, the user then raises the piston element 32 higher in the cylindrical cup 27 by rotating the pivoting handle lever mechanism 49 further, thereby providing for a greater duration flush.

Alternatively, the pivoting handle lever mechanims 49 could be provided with a click stop 51 midway between the normally closed handle position 52 and the fully rotated position 53.

If the handle lever mechanism 49 is rotated to the first click stop 51, sufficient liquid would be introduced into the toilet bowl for flushing, for example, liquid waste materials from the toilet bowl 26 (a low volume flush). In the case of flushing solid waste materials from the toilet bowl 26 (a high volume flush), the handle lever mechanism 49 is rotated to its fully rotated position 52 which would introduce sufficient liquid into the toilet bowl 26 for flushing such materials therefrom. Since the volume of liquid required for the low and high volume flushes may vary in different toilet systems, the adjustment ring 38 may be utilized to increase and decrease the volume of liquid used in both flushes by adjusting the degree of registry between the bleeder orifices 36 and the orifices 39 through the adjustment ring 38. Also, additional click stops could be provided for the handle lever mechanism 49 between the closed position 52 and the fully rotated position 53 for the additional intermediate volume flushes.

Since the liquid draining from the toilet tank 13 always has a maximum pressure head determined by the liquid level in the toilet tank 13, the liquid flowing into the toilet bowl 26 will always have the maximum available energy for washing and evacuating materials from the toilet bowl 26.

While the invented regulatable flush valve for tank type toilets is described with respect to a particular preferred embodiment, it should be apparent that numerous variations and modifications can be effected within the spirit and scope of the invention as described and as defined and set forth in the appended claims.

We claim:

1. In a tank type flush toilet including a tank for containing a liquid flushing medium, a bowl for receiving waste materials, an outlet communicating between said tank and bowl and a pivoting handle and lever mechanism for lifting a valving element disposed in said outlet of said tank, a regulatable flush valve mechanism comprising in combination therewith, a liquid vortex generating element secured coaxially above said outlet within said tank, a cup element secured coaxially above said liquid vortex generating element having a bottom with a hole defined therethrough axially aligned with said outlet, a valve element having a central passageway disposed coaxially within said vortex generating element adapted to plug said outlet, an overflow tube having a lower end secured to and communicating with said central passageway of said valve element and extending upwardly therefrom through said hole defined in the bottom surface of said cup element to a point above said cup element, said overflow tube having an upper end secured to the lever of said pivoting handle and lever mechanism whereby said liquid flushing medium overflows into said tube, a piston element coaxially secured to said overflow tube axially positioned within said cup element to provide in combination therewith an enclosed volume, check valve means for permitting the liquid flushing medium to flow into and preventing said liquid from flowing out of said enclosed volume defined by said piston and cup elements, regulating means for controlling flow of said liquid flushing medium out of said enclosed volume defined by said piston and cup elements whereby turning said handle of said handle and lever mechanism raises said overflow tube, piston element and valve element allowing the liquid flushing medium to flow from said tank through said vortex generating element out said outlet and into said bowl, the volume of liquid flowing from the tank being determined by the distance said valve element is raised above the outlet and by the rate at which said liquid flows from said enclosed volume.

2. The apparatus of claim 1 wherein said vortex generating element comprises a cylindrical element having a plurality of planer vanes parallel to its longitudinal axis oriented to direct liquid flow tangentially into its interior volume.

3. The apparatus of claim 2 wherein said valve element has a frusto-conical configuration, the lower end of said overflow tube being secured to the base of said frusto-conical valve element, the apex of said frusto-conical valve element adapted to extend into said outlet.

4. The apparatus of claim 3 wherein said frusto-conical valve element is hollow and has a plurality of ports communicating from its interior through its upper base surface for allowing the liquid flushing medium to fill its interior volume.

5. The apparatus of claim 4 wherein said valve element is composed of a flexible inert material from the class consisting of rubber, silicone rubber and neoprene.

6. The regulatable flush valve of claim 2 wherein said bowl has a liquid distribution system for generating liquid vortexes in the liquid draining into said bowl and wherein said fluid vortex generating element generates a liquid vortex complementary to that generated by the liquid distribution system of said bowl.

7. The apparatus of claim 4 further including a valve seat element mounted coaxially in said outlet of said toilet tank having an annular seating surface adapted to receive and make a water tight seal with the frusto-conical outer walls of said valve element.

8. The apparatus of claim 1 wherein said check valve means comprises in combination,
a plurality of ports defined through said piston element oriented in an annular row,
a flat annular ring coaxially disposed around said overflow tube within said enclosed volume for preventing liquid from flowing out of said enclosed volume through said plurality of ports, and
a retainer ring secured to said overflow tube for holding said flat annular ring proximate said annular row of ports through said piston.

9. The apparatus of claim 1 wherein said regulating means from controlling the flow of liquid flushing medium from said enclosed volume defined by said piston element and said cup element comprises in combination,
at least one bleeder orifice defined through said piston element,
a flat adjustment ring disposed around said overflow tube, said adjustment ring being free to rotate around said overflow tube, said adjustment ring also having an orifice defined therethrough positioned for rotation into registry with said bleeder orifice defined through said piston,
retaining means for securing said flat adjustment ring against said piston whereby the rate of liquid flow from said enclosed volume defined by said piston and cup element may be controlled by adjusting the degree of registry between the bleeder orifice through said piston and the orifice through said flat adjustment ring.

10. The apparatus of claim 1 wherein said liquid vortex generating element, said cup element, said overflow tube and said piston element are each composed of inert rigid materials from the class consisting of plastic, bakelite and fiberglass.

11. A regulatable flush valve for tank type toilets using liquid flushing medium comprising in combination,
a valve seat element mounted coaxially in a drain outlet of a toilet tank,
a liquid vortex generating element secured coaxially above the valve seat element within said toilet tank,
a cup element secured coaxially above said vortex generating element having a bottom with a hole defined therethrough in axial alignment with said outlet of said toilet tank,
a frusto-conical plug element coaxially received within said vortex generating element adapted to seat on said valve seat and establish a liquid tight seal, said plug element having a density greater than said liquid flushing medium,
a rod having a lower end secured to said frusto-conical plug element, extending upwardly therefrom through said hole through the bottom of said cup element to a point above said cup element,
a piston element coaxially secured to said rod axially positioned within said cup element to provide in combination therewith an enclosed volume adapted to be filled with a liquid medium,
a check valve means for permitting the liquid flushing medium to flow into said enclosed volume defined by said piston and cup elements and for preventing said liquid flushing medium from flowing out of said enclosed volume defined by said piston and cup elements,
regulating means for controlling liquid flow out of said enclosed volume defined by said piston and cup elements, and manual means operatively secured to the upper end of said rod for raising said plug element from the valve seat, whereby the volume of water for flushing waste materials from a toilet bowl is determined by the distance said plug is raised above said valve seat and the rate of liquid flow from said enclosed volume defined by said piston and cup elements.

* * * * *